Sept. 3, 1968   J. H. HOLDER   3,399,458
MAGNETIC PROTRACTOR SQUARE
Filed May 9, 1966

INVENTOR,
JOHN H. HOLDER,
BY
Calvin Brown
ATTORNEY

United States Patent Office 3,399,458
Patented Sept. 3, 1968

3,399,458
MAGNETIC PROTRACTOR SQUARE
John H. Holder, 6515 E. Compton Blvd.,
Paramount, Calif. 90723
Filed May 9, 1966, Ser. No. 548,501
2 Claims. (Cl. 33—93)

ABSTRACT OF THE DISCLOSURE

A square base, having a protractor scale marked on it, carries an index plate which is swingable relative to the scale and which supports at one side an elongated straight edge used for guiding a cutting torch. The torch is always so spaced from the main body of the device that no damage can be caused by its flame. Magnets on the square base hold the device on magnetic work. The index plate is lockable in various angular positions thus locking the straight edge.

---

The present invention relates to a magnetic protractor square designed for use with all types of structural bar and plate for straight cuts thereof at any angle without the necessity of performing a layout ahead of the work to be performed. Cuts of the character previously stated may be made on a flat plate, upright stanchions, or beams.

An object of the invention is the provision of a magnetic protractor square which readily adheres to any magnetic material and maintains its position thereon without shifting and wherein the instrument allows cuts at the angle desired by a suitable cutting device such as a cutting torch, the instrument being constructed and arranged to guide movement of the cutting torch without damage to the instrument.

A further object is the provision of a magnetic protractor square which will not warp under use.

A further object is the provision of an instrument which combines a protractor and a square so constructed that accuracy between the said members is maintained.

A further object is an instrument comprising a protractor and a square which is portable, inexpensive in cost of manufacture, durable, efficient in operation, and easy to use.

Figure 6:
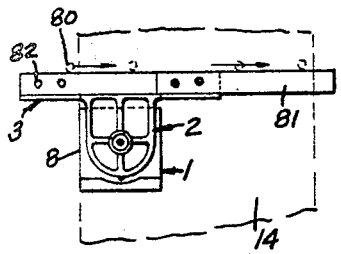
Figures 7, 8:
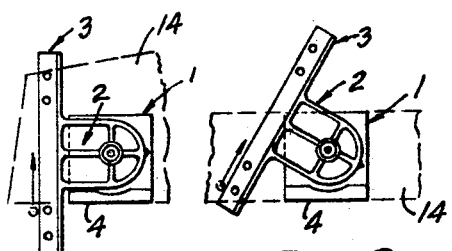

FIGURES 6, 7, and 8 are plan views of the device shown on work (indicated in dotted lines) and in various positions for performing different operations on the work.

The instrument or device includes a base 1, an index plate 2 and a straight edge, blade, or ruler 3 carried by the index plate 2.

Figure 1:
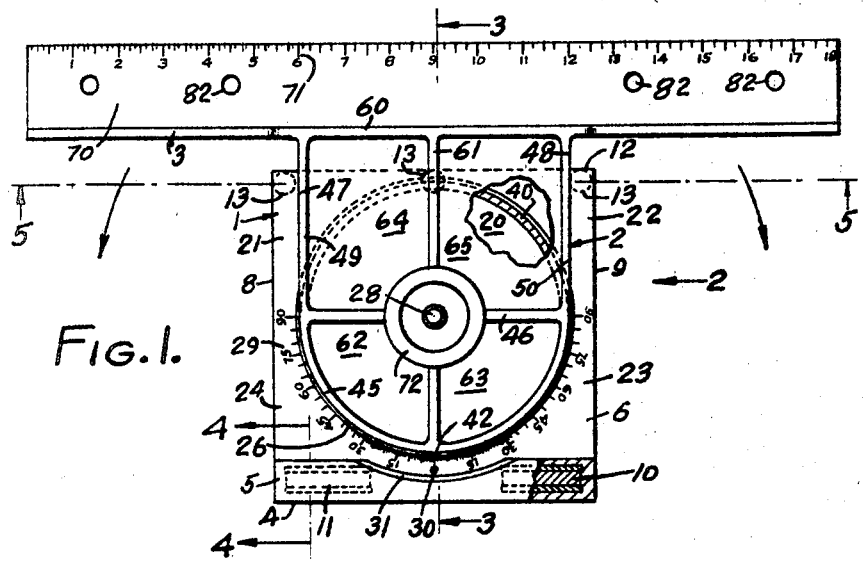
FIGURE 1 is a fragmentary sectional plan view of the preferred embodiment of the invention.
Figure 4:
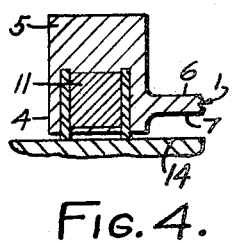
FIGURE 4 is an enlarged fragmentary sectional view on the line 4—4 of FIGURE 1.

The base 1 is substantially square, which is to say, that the joining sides thereof are in 90° relationship and of equal length as shown in FIGURE 1. The base is provided adjacent the edge 4 with a flange or enlargement 5 which extends above the top surface 6 of the base and likewise below the bottom surface 7 thereof as indicated in FIGURE 4. The flange 5 extends the entire lateral distance between the edges 8 and 9. Imbedded within flange 5 at the bottom surface thereof and inwardly from the side edges 8 and 9 are a pair of magnets 10 and 11 having pairs of side steel pole pieces as illustrated in FIGURE 4. These magnets may be of the ceramic type having a magnetic field of high intensity.

Figure 5:
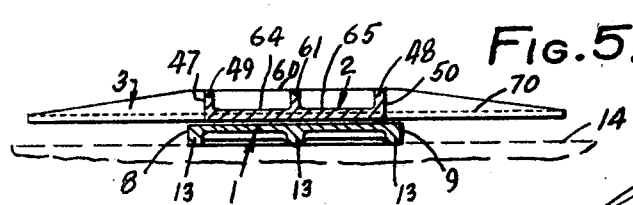
FIGURE 5 is a sectional view on the line 5—5 of FIGURE 1.

Preferably, the base 1 is formed from non-magnetic material such as an aluminum-copper-magnesium alloy commonly known as duralumin. The pole pieces for each magnet extend slightly below the base portion of the flange 5 as shown in FIGURE 4. Adjacent the base edge 12 and at the corners between said edge and edges 8 and 9 and intermediate thereof, are feet 13 formed on the bottom of the base as shown in FIGURE 5. The feet plus the magnet pole pieces maintain the base substantially level upon a surface, such as the working surface 14 in FIGURES 2 and 6. The base 1 is provided with an embossment comprising a circular edged table portion 20 which extends above the top surface areas shown in FIGURE 1 at 21, 22, 23 and 24. These latter areas all lie in a common plane and the plane of the table portion 20 shown at 25 is substantially parallel to the areas 21 to 24 inclusive. The curved edge of the table portion 20 is in the form of a flange 26. The bottom surface of the table portion is provided with a central boss 27 which is bored and has fixed thereto an upwardly projecting screw 28.

Engraved or otherwise applied on the base areas 23 and 24 and surrounding the curved flange 26 is a protractor scale 29. In the present instance the protractor scale is so graduated as to provide for a zero marking at 30 which is half way between the edges 8 and 9 of the base with the protractor scale graduated to a 90° reading on either side of the zero marking. The flange 5 on the inner upright surface facing the curved flange 26 and lying between the magnets 10 and 11 is of sloping arcuate form as shown at 31. See FIGURES 1 and 3.

Figure 2:
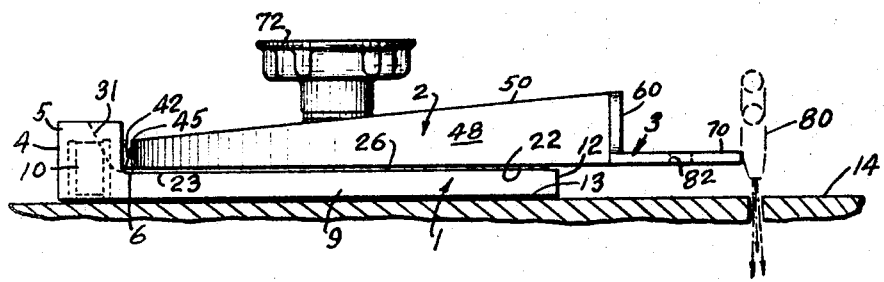
FIGURE 2 is a fragmentary sectional view, on an enlarged scale, looking in the direction of arrow 2 of FIGURE 1.

The index plate 2 is provided on its base surface with a circular flange 40 and the base of said plate is adapted to overlie and contact the surface 25 of the table portion 20 of the base, with the curved flange 40 closely encircling the circular flange 26 of the base. Centrally of the circular flange 40 and extending from the top surface of the index plate, is a boss 41 through which boss is passed the screw 28. This construction allows the index plate to be revolved relative to the base and the index plate carries an index pointer 42 for movement over the protractor scale 29. The index plate is so formed that in addition to the circular flange 40, the top of the index plate is provided with a semi-circular flange 45 which in the position of FIGURE 1 extends between both 90° markings of the protractor scale. In the showing of FIGURE 1 a diametric flange 46 joins the ends of the semi-circular flange. The diametric flange is interrupted by the boss 41. The index plate is extended beyond the edge 12 of the base plate when the parts are in assembly with the side edges 47 and 48 substantially tangent to the curved flange 45 and at right angles to the diametric flange 46. The top surface of the index plate carries flanges 49 and 50 at the side edges 47 and 48, and the flanges merge with the curved flange 45. Flanges 49 and 50 are substantially of triangular form and increase in depth from the curved flange 45 outwardly as shown in FIGURE 2. What is termed the base ends of said flanges 49 and 50 are joined with flange 60, flange 60 being at right angles to the ends of the flanges 49 and 50. There is also a flange 61 which lies intermediate the flanges 49 and 50 and which flange joins with the curved flange 45. Flanges 49, 50 and 61 are of equal height and form. The arrangement of the flanges provides quadrant areas in the index plate at 62 and 63 and rectangular areas at 64 and 65 of the plate which join with the flange 60.

Figure 3:
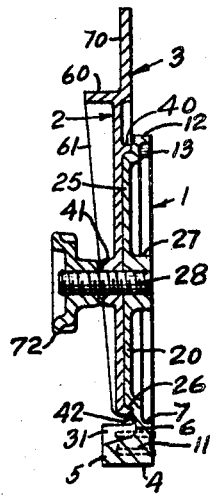
FIGURE 3 is a sectional view on the line 3—3 of FIGURE 1.

The flange 60 forms a part of the straight edge, blade or ruler 3. The straight edge 3 has part 70 extending outwardly at right angles to flange 60 and the flange and the straight edge are preferably integrally formed. The straight edge is provided with indicia 71 extending the length thereof and adjacent the outer edge. In the present instance the straight edge is 18″ in length and has eighth of an inch markings. As shown in FIGURE 1 the length of the flange 60 between the flanges 49 and 50 is substantially six inches which leaves six inches on both sides of the flanges 49 and 50. This construction provides for a rigid straight edge in its connection with the index plate, particularly as the flange 60 has depth as shown in FIGURE 3 and is braced by flanges 49, 50 and 61. As shown in FIGURE 5, the flange 60 tapers from the central portion thereof which portion is connected to the flanges 49, 50 and 61 of the index plate. Thus, it is apparent that the index plate and the straight edge or blade are in rigid connection. This is important to avoid error in the use of the actual device. In the assembly of the index plate on the base, I may provide a washer surrounding the screw 28 and bearing against the hub 41. A handle or knob 72 is threaded upon the screw 28 and bears against the washer as shown in the several figures, particularly FIGURE 3.

The operation, uses and advantages of the invention are as follows.

It is assumed that the device has been assembled whereupon it will have the appearance shown in FIGURES 1, 2 and 3. To use the instrument, reference is made to FIGURES 6, 7 and 8 wherein in FIGURE 6 the edge 8 of the base is placed parallel to and adjacent to the edge of work. The base 1, of course, rests on the working surface 14 of said work. The magnets 10, 11 by being of the high intensity type and adjacent one edge of the base 1 permit the base to be placed in position on the working surface, or to be removed from the working surface by merely tipping the instrument considered as an entirety, that is, tipping the base upwardly from the position of FIGURE 4, or to replace the base upon the working surface by tipping the base downwardly using the flange 5 as a fulcrum. In FIGURE 6 the straight edge is at a right angle to the edge 8 of the base and likewise to an edge of the work. If the work is a plate and it is desired to cut the plate, a cutting torch such as shown in FIGURE 2 at 80 may be employed and the flame of the torch will sever the plate in the manner depicted in FIGURE 2 as the torch is moved along and guided by the straight edge or blade. The flame of the torch is below the straight edge as shown and the torch is positioned outwardly from the base 1 and index plate 2 to prevent warpage of the members. The same procedure may be followed for other types of work as indicated in FIGURES 7 and 8 and wherein in FIGURE 8 the straight edge and index plate have been turned to register a certain degree on the protractor scale thus providing for an angular cut when the cutting flame of the torch follows the edge of the straight edge. It is evident that the base acts as a square which is to be properly positioned relative to the work and held so positioned by the magnets. When the base is properly positioned the straight edge may be turned relative to the base and locked in position by knob 72 for the desired angular cut. The device may be used in an upright position as well as a horizontal position for the cutting of a beam or stanchion at any degree of slope. The straight edge 3 may be extended in length by providing blades 81 secured thereto by suitable attachment means passed through bores 82, see FIGURE 6.

I claim:

1. A device of the character described including: a square-sided non-magnetic base plate adapted to be placed in juxtaposition to the work; spaced apart magnets imbedded in said base plate and having their pole pieces extending slightly below the bottom of said base plate so as to be capable of contacting magnetic work to hold the device fixed to the work yet readily removable therefrom; an index plate mounted on top of the base plate; operator-controlled means locking the index plate to the base plate but when released by the operator permitting swinging of the index plate on the base plate in either direction; an arcuate protractor scale provided on the upper surface of the base plate and reading to 90° on either side of the zero mark; the index plate having an index pointer fixed to it for play over the protractor scale when the index plate is swung; and a straight edge fixed to one side of the index plate so as to be spaced laterally from the base plate and extending a substantial distance in each direction from the index plate to provide a straight guide of substantial length for a cutting torch; the index plate and the affixed straight edge being swingable as a unit relative to the base plate through an arc of 180° and being lockable at any point in said arc; said straight edge being elevated a substantial distance above the work when the device is held thereon by said magnets, and furthermore being of such lateral dimensions that the cutting torch when it is moved along said straight edge in a cutting operation, is sufficiently spaced from the index plate and base plate to obviate damage to the device.

2. The invention defined in claim 1, wherein the base plate has an upstanding flange adjacent one edge thereof and said magnets are imbedded in said flange; the index plate is semi-circular for about half its area for cooperation with said arcuate protractor scale, and is rectangular for the other half of its area and projects outwardly beyond the square base; said straight edge is united to the index plate at said outermost part; the index plate being of least thickness at the center of said arcuate portion and being of greatest thickness at said outermost part where joined to said straight edge, and uniformily tapering in thickness from said outermost part to the area of least thickness.

References Cited
UNITED STATES PATENTS

| | | | |
|---|---|---|---|
| 564,549 | 7/1896 | Ayres | 33—75 |
| 1,128,673 | 2/1915 | Foner | 33—75 X |
| 1,416,652 | 5/1922 | Lanbenheimer | 33—93 |
| 1,774,731 | 9/1930 | Sjobring | 33—75 |
| 1,924,094 | 8/1933 | Graham | 33—75 |
| 2,286,664 | 6/1942 | Anderson | 33—27 |
| 2,465,413 | 3/1949 | York | 266—23 |
| 2,813,710 | 11/1957 | Angle. | |

FOREIGN PATENTS

| | | |
|---|---|---|
| 1,052,509 | 9/1953 | France. |

HARRY N. HAROIAN, *Primary Examiner.*